US 8,116,337 B2

(12) United States Patent
Godlewski et al.

(10) Patent No.: US 8,116,337 B2
(45) Date of Patent: Feb. 14, 2012

(54) BANDWIDTH REQUESTS TRANSMITTED ACCORDING TO PRIORITY IN A CENTRALLY MANAGED NETWORK

(76) Inventors: Marcin Godlewski, Lawrenceville, GA (US); James M. Burns, Jr., Dacula, GA (US)

( * ) Notice: Subject to any disclaimer, the term of this patent is extended or adjusted under 35 U.S.C. 154(b) by 341 days.

(21) Appl. No.: 11/829,209

(22) Filed: Jul. 27, 2007

(65) Prior Publication Data

US 2009/0028176 A1    Jan. 29, 2009

(51) Int. Cl.
*H04L 12/403* (2006.01)
*H04L 12/43* (2006.01)
*G01R 31/08* (2006.01)
(52) U.S. Cl. ............... 370/449; 370/230; 370/458
(58) Field of Classification Search .......... 370/230.1, 370/231, 449, 458
See application file for complete search history.

(56) References Cited

U.S. PATENT DOCUMENTS

| | | | |
|---|---|---|---|
| 5,343,465 A | 8/1994 | Khalil | 370/232 |
| 5,491,531 A | 2/1996 | Adams et al. | 375/354 |
| 5,491,694 A | 2/1996 | Oliver et al. | 370/455 |
| 5,537,446 A | 7/1996 | Lakshman et al. | 375/371 |
| 5,570,355 A | 10/1996 | Dail et al. | 370/352 |
| 5,581,555 A | 12/1996 | Dubberly et al. | 370/487 |
| 5,594,726 A | 1/1997 | Thompson et al. | 370/485 |
| 5,659,787 A | 8/1997 | Schieltz | 709/226 |
| 5,678,041 A | 10/1997 | Baker et al. | 707/9 |
| 5,717,861 A | 2/1998 | Rabii | 709/232 |
| 5,719,872 A | 2/1998 | Dubberly et al. | 370/487 |
| 5,732,078 A | 3/1998 | Arango | 370/355 |
| 5,757,801 A | 5/1998 | Arimilli | 370/444 |
| 5,790,546 A | 8/1998 | Dobbins et al. | 370/400 |
| 5,796,724 A | 8/1998 | Rajamani et al. | 370/263 |
| 5,857,193 A | 1/1999 | Sutcliffe et al. | 707/10 |
| 5,867,764 A | 2/1999 | Williams | 725/125 |
| 5,881,231 A | 3/1999 | Takagi et al. | 709/212 |
| 5,884,037 A | 3/1999 | Aras et al. | 709/226 |
| 5,935,218 A | 8/1999 | Beyda et al. | 709/251 |
| 5,946,322 A | 8/1999 | Moura et al. | 370/468 |
| 5,953,344 A | 9/1999 | Dail et al. | 370/443 |
| 5,956,342 A | 9/1999 | Manning et al. | 370/414 |

(Continued)

FOREIGN PATENT DOCUMENTS

EP    0 613 316    8/1994

(Continued)

OTHER PUBLICATIONS

Sally Floyd et al., "Link-Sharing and Resource Management Models for Packet Networks," IEEE/ACM Transactions on Networking, vol. 3, No. 4, Aug. 1995, pp. 365-386.

(Continued)

*Primary Examiner* — Ricky Ngo
*Assistant Examiner* — Paul Masur
(74) *Attorney, Agent, or Firm* — Merchant & Gould (57) ABSTRACT

Systems and methods are disclosed for a managed access network device that generates and transmits a schedule map for requesting bandwidth to a plurality of network devices. The managed access network device then broadcasts a request time where the request time is broken down into a plurality of periods. When a network device generates a packet having a priority, the schedule map is then consulted to determine one of a plurality of periods in which to transmit the request for bandwidth, where each period corresponds with at least one priority. The network device then subsequently transmits the request for bandwidth during the determined period within the request time.

16 Claims, 7 Drawing Sheets

U.S. PATENT DOCUMENTS

| | | | |
|---|---|---|---|
| 5,963,557 A | 10/1999 | Eng | 370/432 |
| 5,963,963 A | 10/1999 | Schmuck et al. | 707/205 |
| 5,995,805 A | 11/1999 | Ogasawara et al. | 707/9 |
| 6,028,860 A | 2/2000 | Laubach et al. | 370/395.64 |
| 6,046,980 A | 4/2000 | Packer | 370/230 |
| 6,075,972 A | 6/2000 | Laubach et al. | |
| 6,084,855 A | 7/2000 | Soirinsuo et al. | 370/235 |
| 6,104,700 A | 8/2000 | Haddock et al. | 370/235 |
| 6,115,390 A | 9/2000 | Chuah | 370/443 |
| 6,125,105 A | 9/2000 | Edwards et al. | 370/230 |
| 6,151,582 A | 11/2000 | Huang et al. | 705/8 |
| 6,175,554 B1 | 1/2001 | Jang et al. | 370/229 |
| 6,208,640 B1 | 3/2001 | Spell et al. | 370/358 |
| 6,222,856 B1 | 4/2001 | Krishnan et al. | 370/468 |
| 6,223,042 B1 | 4/2001 | Raffel | 455/455 |
| 6,243,755 B1 | 6/2001 | Takagi et al. | 709/229 |
| 6,253,203 B1 | 6/2001 | O'Flaherty et al. | 707/9 |
| 6,272,110 B1 | 8/2001 | Tunnicliffe et al. | 370/232 |
| 6,275,824 B1 | 8/2001 | O'Flaherty et al. | 707/9 |
| 6,324,184 B1 | 11/2001 | Hou et al. | 370/468 |
| 6,343,085 B1 | 1/2002 | Krishnan et al. | |
| 6,363,445 B1 | 3/2002 | Jeddeloh | 710/113 |
| 6,408,336 B1 | 6/2002 | Schneider et al. | 709/229 |
| 6,438,141 B1 | 8/2002 | Hanko et al. | 370/477 |
| 6,442,158 B1 | 8/2002 | Beser | 370/352 |
| 6,473,794 B1 | 10/2002 | Guheen et al. | 709/223 |
| 6,477,144 B1 | 11/2002 | Morris et al. | 370/230.1 |
| 6,483,839 B1 | 11/2002 | Gemar et al. | 370/395.42 |
| 6,490,347 B2 | 12/2002 | DeCaluwe et al. | 379/211.01 |
| 6,493,446 B1 | 12/2002 | Cherry | |
| 6,510,162 B1 | 1/2003 | Fijolek et al. | 370/432 |
| 6,516,348 B1 | 2/2003 | MacFarlane et al. | 709/224 |
| 6,529,486 B1 | 3/2003 | Barnes et al. | 370/327 |
| 6,539,427 B1 | 3/2003 | Natarajan et al. | 709/224 |
| 6,542,463 B1 | 4/2003 | Heeke | 370/230 |
| 6,542,500 B1 | 4/2003 | Gerszberg et al. | 370/354 |
| 6,542,593 B1 | 4/2003 | Bowman-Amuah | 379/201.03 |
| 6,546,017 B1 | 4/2003 | Khaunte | 370/412 |
| 6,553,568 B1 | 4/2003 | Fijolek et al. | 725/111 |
| 6,560,243 B1 | 5/2003 | Mogul | 370/468 |
| 6,563,829 B1 | 5/2003 | Lyles et al. | 370/395.21 |
| 6,567,418 B1 | 5/2003 | Farah | 370/437 |
| 6,577,597 B1 | 6/2003 | Natarajan et al. | 370/232 |
| 6,577,642 B1 | 6/2003 | Fijolek et al. | 370/465 |
| 6,580,723 B1 | 6/2003 | Chapman | 370/442 |
| 6,598,057 B1 | 7/2003 | Synnestvedt | 707/200 |
| 6,611,726 B1 | 8/2003 | Crosswhite | 700/99 |
| 6,615,166 B1 | 9/2003 | Guheen et al. | 703/27 |
| 6,636,482 B2 | 10/2003 | Cloonan et al. | 370/230 |
| 6,643,290 B1 | 11/2003 | Glade | 370/395.4 |
| 6,654,957 B1 | 11/2003 | Moore et al. | 725/111 |
| 6,658,010 B1 | 12/2003 | Enns et al. | 370/401 |
| 6,665,271 B1 | 12/2003 | Thomas et al. | 370/252 |
| 6,667,956 B2 | 12/2003 | Beshai et al. | 370/238 |
| 6,671,724 B1 | 12/2003 | Pandya et al. | 709/226 |
| 6,671,818 B1 | 12/2003 | Mikurak | 714/4 |
| 6,680,922 B1 | 1/2004 | Jorgensen | 370/328 |
| 6,701,342 B1 | 3/2004 | Bartz et al. | 709/200 |
| 6,715,075 B1 | 3/2004 | Loukianov | 713/176 |
| 6,754,177 B1 | 6/2004 | Gersht et al. | 370/233 |
| 6,754,228 B1 | 6/2004 | Ludwig | 370/468 |
| 6,763,000 B1 | 7/2004 | Walsh | 370/252 |
| 6,823,385 B2 | 11/2004 | McKinnon, III et al. | |
| 6,845,106 B2 | 1/2005 | McKinnon, III et al. | |
| 6,848,004 B1 | 1/2005 | Chang et al. | 709/232 |
| 6,850,764 B1 | 2/2005 | Patel | |
| 6,859,926 B1 | 2/2005 | Brenner et al. | |
| 6,865,170 B1 | 3/2005 | Zendle | |
| 6,882,623 B1 | 4/2005 | Goren et al. | |
| 6,912,232 B1 | 6/2005 | Duffield et al. | 370/468 |
| 6,917,614 B1 | 7/2005 | Laubach et al. | 370/392 |
| 6,917,622 B2 | 7/2005 | McKinnon, III et al. | |
| 6,917,628 B2 | 7/2005 | McKinnon, III et al. | |
| 6,993,044 B2 | 1/2006 | McKinnon, III et al. | |
| 7,009,992 B2 | 3/2006 | McKinnon, III et al. | |
| 7,065,779 B1 | 6/2006 | Crocker et al. | |
| 7,068,597 B1 | 6/2006 | Fijolek et al. | 370/230 |
| 7,113,484 B1 | 9/2006 | Chapman et al. | |
| 7,145,887 B1 * | 12/2006 | Akgun et al. | 370/321 |
| 7,184,398 B2 | 2/2007 | McKinnon, III et al. | |
| 7,274,667 B2 | 9/2007 | McKinnon, III et al. | |
| 7,299,284 B2 | 11/2007 | McKinnon, III et al. | |
| 7,333,495 B2 | 2/2008 | Sala et al. | 370/395.21 |
| 7,499,453 B2 | 3/2009 | Carlson et al. | 370/395.2 |
| 7,848,234 B2 | 12/2010 | McKinnon, III | |
| 7,856,497 B2 | 12/2010 | McKinnon, III et al. | |
| 7,920,594 B2 | 4/2011 | Carlson et al. | |
| 7,925,750 B2 | 4/2011 | McKinnon, III et al. | |
| 7,957,417 B2 | 6/2011 | Mckinnon, III et al. | |
| 7,970,011 B2 | 6/2011 | Carlson et al. | |
| 7,983,272 B2 | 7/2011 | Carlson et al. | |
| 2001/0011247 A1 | 8/2001 | O'Flaherty et al. | 705/39 |
| 2002/0093912 A1 * | 7/2002 | Gummalla et al. | 370/229 |
| 2002/0118645 A1 * | 8/2002 | Narayana et al. | 370/231 |
| 2002/0154655 A1 | 10/2002 | Gummalla et al. | 370/468 |
| 2002/0173316 A1 | 11/2002 | Jang et al. | 455/453 |
| 2004/0184472 A1 * | 9/2004 | Carroll | 370/442 |
| 2005/0254419 A1 * | 11/2005 | Barker et al. | 370/229 |
| 2006/0114926 A1 | 6/2006 | McKinnon et al. | 370/443 |
| 2006/0120282 A1 | 6/2006 | Carlson et al. | 370/229 |
| 2007/0058545 A1 * | 3/2007 | Nookala et al. | 370/230 |
| 2007/0133409 A1 | 6/2007 | McKinnon, III et al. | 370/230 |
| 2008/0037578 A1 | 2/2008 | Carlson et al. | 370/463 |
| 2008/0112429 A1 * | 5/2008 | McKinnon et al. | 370/442 |
| 2008/0144660 A1 | 6/2008 | Godlewski | 370/468 |
| 2009/0070454 A1 | 3/2009 | McKinnon, III et al. | 709/224 |
| 2009/0207731 A1 | 8/2009 | Carlson et al. | 370/232 |
| 2009/0213871 A1 | 8/2009 | Carlson et al. | 370/462 |

FOREIGN PATENT DOCUMENTS

| | | |
|---|---|---|
| EP | 0 742 658 | 11/1996 |
| WO | WO 99/27686 | 6/1999 |
| WO | WO 00/56021 A | 9/2000 |

OTHER PUBLICATIONS

X. Wang et al., "A predictive bandwidth management scheme and network architecture for real-time VBR traffic," Microprocessors and Microsystems, vol. 22, No. 10, May 1999, pp. 597-604.

Anurag Kumar et al., "Nonintrusive TCP Connection Admission Control for Bandwidth Management of an Internet Access Link," IEEE Communications Magazine, vol. 38, No. 5, May 2000, pp. 160-167.

Bhumip Khasnabish et al., "Bandwidth Management/Policing in ATM Networks for Serving Multi-Category Traffic using a Simple Learning Algorithm and a Bucket Bank," Global Telecommunications Conference, 1993, pp. 1149-1153.

IBM Technical Disclosure Bulletin #NB9203470.

Beauregard, Brian Conrad, "Overview of the Cable Modem," WPI Department of Electrical and Computer Engineering [online] Technologies Course Homepage, Mar. 23, 1996 [Retrieved on Dec. 18, 2000]. Retrieved from the Internet at <URL:http://www.ece.wpl.edu.courses/ee535/hwk96/hwk4cd/bcbeau/nodel.html>.

White, Gerry, "Additions to Cable Spec Enable QoS," [online] Article in Network World Fusion, Jun. 19, 2000 {Retrieved on Dec. 19, 2000]. Retrieved from the Internet at <URL:http://www.nwfusion.com/cgl-bin.mailto/x.cgi>.

RiverDelta Networks, RiverDelta Networks Executive to Discuss Advanced Quality of Service Techniques at Cable-Tec Expo 2000 [online] Press Release, May 31, 2000 [Retrieved Dec. 19, 2000]. Retrieved from the Internet at <URL:http://www.riverdelta.com/pr053100.html>.

RiverDelta Networks, RiverDelta Raises $10 Million to Bring Enhanced Broadband Services to Next-Generation Cable Providers [online] Press Release, Dec. 19, 1999 [Retrieved Dec. 19, 2000]. Retrieved from the Internet at <URL:http://www.riverdelta.com/pr121399.html>.

RiverDelta Networks, QoS: One HFC Network, Multiple Revenue Streams [online] White Papers, [Retrieved on Dec. 19, 2000]. Retrieved from the Internet at <URL:http://www.cabledatacomnews.com/whitepapers/paper08.html>.

Telecommunications Online, RiverDelta Networks (www.riverdelta.com)—A One-Box MSA Solution [online] Newsletter article, Jul.

2000 [Retrieved on Dec. 10, 2000]. Retrieved from the Internet at <URL:http://www.telecommagazine.com/products/200007/20000701.html>.
White, Gerry, QoS: Enabling Multiple Services on Cable Networks, [online] Telecommunications Online Newsletter Article, Oct. 2000, [Retrieved on Dec. 19, 2000]. Retrieved from the Internet at <URL:http://www.telecoms.mag.com/issues.200010/tcs/qos.sub.--enabling.-html>.
International Engineering Consortium, How Cable Modems Work [online] Web ProForum Tutorial Course, Aug. 2, 2000 [Retrieved on Dec. 18, 2000]. Retrieved from the Internet at <URL:http://www.iec/org/tutorials/cable.sub.-mod/topic01.html?Nest.x=-34XNext.y=20>.
International Engineering Consortium, Cable Data System Features [online] Web ProForum Tutorial Course, Aug. 3, 2000 [Retrieved on Dec. 18, 2000]. Retrieved from the Internet at <URL:http://www.iec/org/tutorials/cable/sub.--mod/topic02.html>.
International Engineering Consortium, Cable Data Network Architecture [online] Web ProForum Tutorial Course, Aug. 2, 2000 [Retrieved on Dec. 18, 2000]. Retrieved from the Internet at <URL:http://www.iec/org/tutorials/cable.sub.--mod/topic03.html>.
International Engineering Consortium, Cable Data Network Standards [online] Web ProForum Tutorial Course, Aug. 3, 2000 [Retrieved on Dec. 18, 2000]. Retrieved from the Internet at <URL:http://www.iec/org/tutorials/cable.sub.--mod/topic04.html?Next.x=-40&Next.y=18>.
Ostergaard, Rolf B., Cable Modems.Org: Your Cable Modem Reference Guide, [online] Tutorial 1998-2000 [Retrieved on Dec. 18, 2000]. Retrieved from Internet at <URL:http://www.cable-modems.org/tutorial>.
Time Warner Cable, Road Runner Subscription Agreement, Jan. 1999, pp. 1-4.
White, Gerry, Eliminating Open Access Technology Barriers [online] Telecommunications Online Newsletter Article, Jul. 2000 [Retrieved on Dec. 10, 2000]. Retrieved from the Internet at <URL:http://telecommagazine.com/issues/20007/tcs/elimin.html>.
Green, Tim, DSL Has a Secret [online] Network World Fusion Article, Mar. 2, 1999 [Retrieved on Dec. 22, 2000]. Retrieved from the Internet at <URL:http://cnn.com/TECH/computing/9903/02/dslsecretlidg/>.
Cable Television Laboratories, Inc., Cable Data Modem Performance Evaluation: A Primer for Non-Technical Readers, Nov. 15, 1996, pp. 1-8.
RiverDelta Networks, Inc., QoS: The Key to Maximizing Revenue: A Technical Guide for Cable Operators [online] PDF Document, Publication Date Unknown [Retrieved on Dec. 18, 2000]. Retrieved from Internet at <URL:http://www.riverdelta.com>, pp. 1-8.
Cable Television Laboratories, Inc., Cable Data Modem Performance Evaluation: A Primer for Non-Technical Readers, Apr. 1996, pp. 1-3.
Ddri Diversified Data Resources, Inc., ACE-SNMP Web Based SNMP Network Management System an Introductory Overview of SNMP, 1999, <URL:http://www.ddri.com>, pp. 1-32.
Data-Over-Cable Service Interface Specifications, Radio Frequency Interface Specification, SP-RFv1.-104-00047 Interim Specification; 2000 Cable Television Laboratories, Inc., 1999, pp. 229-231, 263, 121-141, 157-217, and 277-283.
U.S. Office Action dated Jul. 6, 2004 cited in U.S. Appl. No. 09/800,861.
U.S. Office Action dated Sep. 16, 2004 cited in U.S. Appl. No. 09/800,735.
U.S. Office Action dated Dec. 2, 2004 cited in U.S. Appl. No. 09/801,155.
U.S. Office Action dated Dec. 15, 2004 cited in U.S. Appl. No. 09/800,717.
U.S. Office Action dated Dec. 16, 2004 cited in U.S. Appl. No. 09/800,608.
U.S. Office Action dated Apr. 11, 2005 cited in U.S. Appl. No. 09/801,155.
U.S. Office Action dated May 4, 2005 cited in U.S. Appl. No. 09/800,608.
U.S. Office Action dated May 19, 2005 cited in U.S. Appl. No. 09/800,735.
U.S. Office Action dated May 27, 2005 cited in U.S. Appl. No. 09/935,514.
U.S. Office Action dated Jun. 13, 2005 cited in U.S. Appl. No. 09/800,717.
U.S. Final Office Action dated Oct. 31, 2005 cited in U.S. Appl. No. 09/800,608.
U.S. Office Action dated Nov. 16, 2005 cited in U.S. Appl. No. 09/935,514.
U.S. Office Action dated Dec. 14, 2005 cited in U.S. Appl. No. 09/800,717.
U.S. Office Action dated Jan. 5, 2006 cited in U.S. Appl. No. 09/935,514.
U.S. Office Action dated Apr. 20, 2006 cited in U.S. Appl. No. 09/800,608.
U.S. Office Action dated May 30, 2006 cited in U.S. Appl. No. 09/800,717.
U.S. Office Action dated Jun. 30, 2006 cited in U.S. Appl. No. 09/935,514.
U.S. Final Office Action dated Oct. 4, 2006 cited in U.S. Appl. No. 09/800,608.
U.S. Final Office Action dated Nov. 16, 2006 cited in U.S. Appl. No. 09/800,717.
U.S. Office Action dated Jan. 29, 2007 cited in U.S. Appl. No. 09/800,608.
U.S. Office Action dated Jul. 24, 2007 cited in U.S. Appl. No. 10/410,878.
U.S. Office Action dated Apr. 16, 2008 cited in U.S. Appl. No. 10/410,878.
U.S. Office Action dated Dec. 22, 2008 cited in U.S. Appl. No. 11/275,208.
U.S. Office Action dated Apr. 15, 2009 cited in U.S. Appl. No. 11/676,318.
U.S. Office Action dated Apr. 17, 2009 cited in U.S. Appl. No. 11/612,524.
U.S. Office Action dated Apr. 29, 2009 cited in U.S. Appl. No. 10/276,654.
U.S. Office Action dated May 12, 2009 cited in U.S. Appl. No. 11/856,761.
U.S. Final Office Action dated May 13, 2009 cited in U.S. Appl. No. 11/275,208.
U.S. Office Action dated Jun. 16, 2009 cited in U.S. Appl. No. 11/875,369.
International Search Report dated May 27, 2008 cited in PCT/US2007/086945.
International Search Report dated Aug. 28, 2008 cited in PCT/US2008/070847.
European Official Communication dated Jun. 4, 2009 cited in Application No. 01914723.0.
U.S. Final Office Action dated Oct. 6, 2009 cited in U.S. Appl. No. 11/612,524.
U.S. Final Office Action dated Nov. 24, 2009 cited in U.S. Appl. No. 11/676,318.
U.S. Office Action dated Nov. 24, 2009 cited in U.S. Appl. No. 11/856,761.
U.S. Final Office Action dated Nov. 25, 2009 cited in U.S. Appl. No. 10/276,654.
Canadian Office Action dated Oct. 14, 2009 cited in Appln No. 2,409,904.
European Examination Report dated Nov. 18, 2009 cited in Appln No. 01 914 723.0-2416.
U.S. Office Action dated Apr. 29, 2010 cited in U.S. Appl. No. 12/388,659.
U.S. Office Action dated May 10, 2010 cited in U.S. Appl. No. 12/388,663.
U.S. Office Action dated May 24, 2010 cited in U.S. Appl. No. 11/856,761.
U.S. Office Action dated Sep. 17, 2010 cited in U.S. Appl. No. 12/388,659.
U.S. Office Action dated Sep. 23, 2010 cited in U.S. Appl. No. 12/388,663.

U.S. Office Action dated Nov. 2, 2010 cited in U.S. Appl. No. 11/856,761.
International Preliminary Report on Patentability mailed Feb. 11, 2010 in PCT/US2008/070847.
European Official Communication dated Jun. 9, 2010 cited in Application No. 07 865 457.1.

U.S. Office Action dated Aug. 3, 2010 cited in U.S. Appl. No. 11/275,208.
European Official Communication dated Feb. 21, 2011 in Application No. 08 796 469.8.

* cited by examiner

FIG. 1
Prior Art

QoS Priorities

0 – Best Effort
1 – Background
2 – Standard (Spare)
3 – Excellent Load (Business Critical)
4 – Controlled Load (Streaming Multimedia, Voice)
5 – Video (Interactive Media)
6 – Voice
7 – Network Control Reserved Traffic

BANDWIDTH REQUESTS TRANSMITTED ACCORDING TO PRIORITY IN A CENTRALLY MANAGED NETWORK

FIELD OF THE INVENTION

This invention relates in general to video, telephony, and data systems over a centrally managed network, and more particularly, to the field of requesting bandwidth for the transmission of video, telephony, and data packets over the network.

DESCRIPTION OF THE RELATED ART

Network devices, such as cable modems, voice over Internet Protocol (VoIP) gateways, media terminal adapters (MTAs), and set-tops, are typically the interface to the physical telephony and/or video equipment required for packet transport. Today, these network devices provide quality of service (QoS) for video, voice, and data packets generated by phones, computers, or televisions that are connected to the network devices.

Due to packet congestion in the access network, QoS is used to create transport guarantees for the video, voice, and data packets dynamically. More specifically, QoS is used in a centrally managed access network to ensure low latency and guaranteed bandwidth for certain packets. Network devices request bandwidth from managing access network devices prior to transmitting packets. Accordingly, the managing access network devices authorize bandwidth depending upon the requested packet priorities (i.e., the requested packet's QoS). The QoS priorities normally range from 0 through N, where N indicates the most critical packets. Conventionally, however, the network devices, e.g., cable modems, set-top boxes, MTAs, etc., all request bandwidth during a predetermined period resulting in collisions among the bandwidth requests. Additionally, all network devices request at the same time during the predetermined period regardless of priority, so that a priority N request may collide with a priority lower than, or higher than, the N request. Therefore, there is a need for a system and method that allows for bandwidth requests in a centrally managed access network that depends upon a priority of requests in order to avoid request packet collisions.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENT

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards systems and methods that allow network devices to request bandwidth based on a packet's QoS priority. The QoS priority for the packet is mainly determined by the network operator and depends upon many variables, such as number of subscribers and equipment employed in the network. In accordance with the present invention, network devices in the system request bandwidth according to a scheduling map. The scheduling map, which gives specific times within a request period, for requesting bandwidth corresponding with a packet priority, is downloaded to all network devices. Each network device then consults the scheduling map in order to determine the specific time during the request period in which to transmit a request packet. Importantly, since the network devices then transmit requests at different times with the request period, collisions are eliminated or dramatically minimized. Additionally, bandwidth requests for critical priority packets can be grouped together during the different times to ensure that a critical packet request does not collide with a lower packet request.

Figure 1:
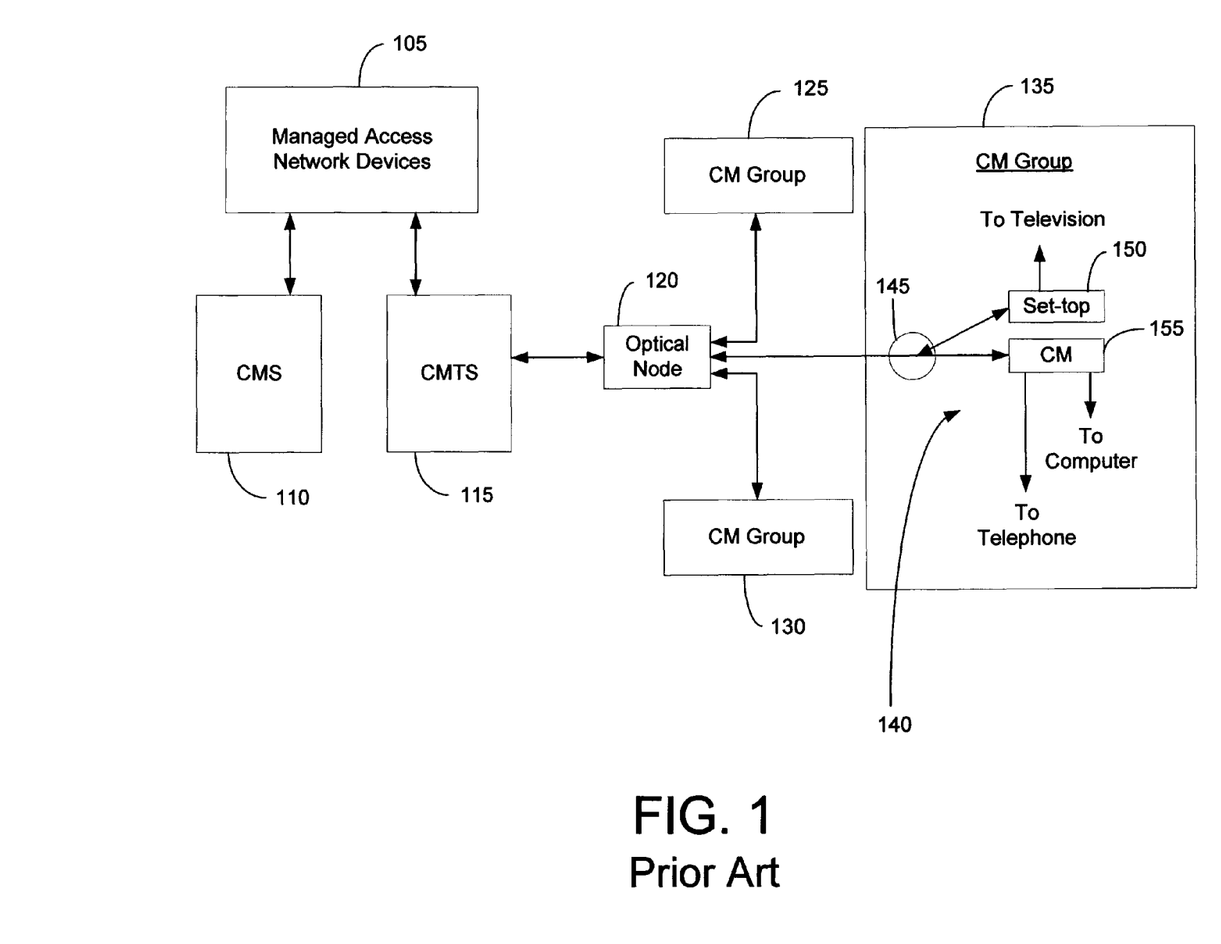
FIG. 1 illustrates a centrally managed network for transmitting video, voice, and data packets.

FIG. 1 illustrates a centrally managed access network for transmitting video, voice, and data packets. Managed access network devices 105 are responsible for providing connections between devices that provide for media, signaling, provisioning, and QoS. For example, a call management server (CMS) 110 receives requests for making calls via the managed access network devices 105. The CMS 110 then initiates and processes signals related to that call. A cable modem terminal system (CMTS) 115 manages sessions over the managed access network 100 utilizing a Data over Cable Service Interface Specification (DOCSIS) protocol. The CMTS 115 is responsible for assuring that all cable modems (CMs) on the network 100 remain synchronized. Typically, an optical node 120 receives the optical signals received from the CMTS 115 and converts the signals to electrical signals. There may be several optical nodes having several CM groups 125, 130, 135 coupled to an output of one of the optical nodes. An example of one subscriber within a CM group 135 is shown. An RF splitter 145 splits the downstream signals providing signals to a set-top device 150 and a cable modem 155. The set-top device 150 may be connected to a television or other viewing device for displaying video/audio signals. Additionally, the set-top device 150 may include a reverse transmitter or a cable modem to transmit reverse packets. The cable modem 155 filters signals that are provided to a coupled telephone and/or a computer. Typically, all network devices, 150, 155 are two-way capable allowing for interactive transmission of packets between the network device 150, 155 and managed access network devices 105. Furthermore, as mentioned, some of these packets have an associated QoS priority depending upon the application.

Figure 2:
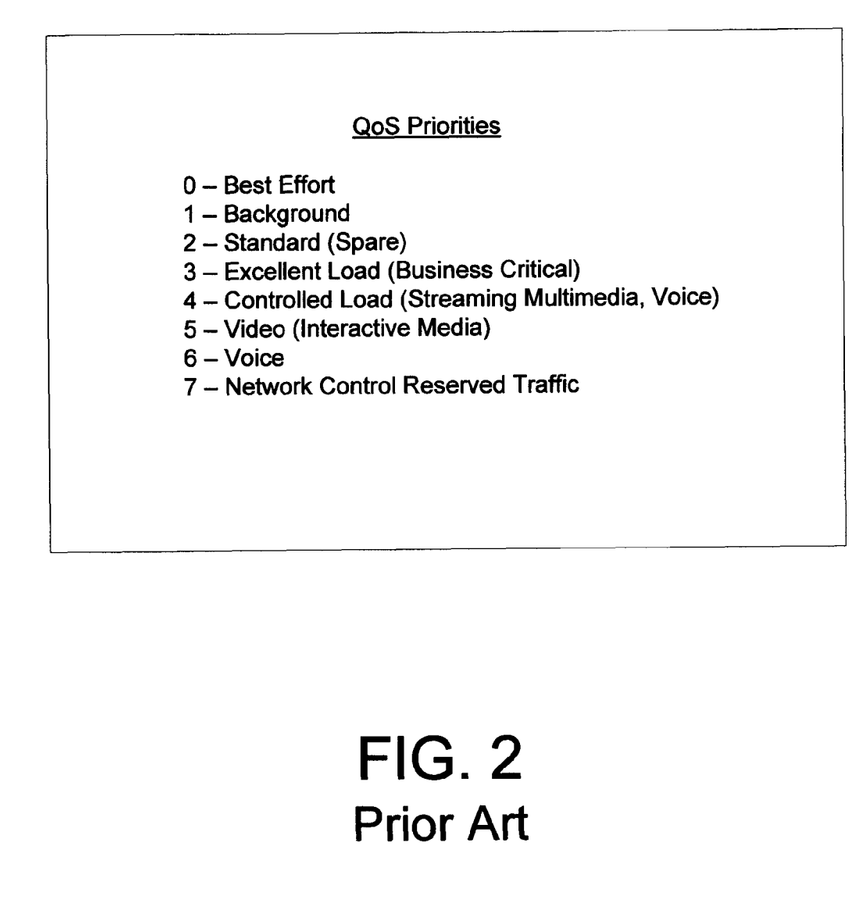
FIG. 2 is a table illustrating an example of QoS priorities.

FIG. 2 is a table illustrating an example of QoS priorities. In this example, a 0 priority indicates a best effort. This may be reserved for Internet browsing. Other lower priorities include 1-3 that may be used for standard or business critical packets. Higher priorities in this example are priorities 4-6, where priority 4 is a controlled load for streaming multimedia and voice, priority 5 for video (e.g., interactive media), and priority 6 for voice calls. Priority 7 may be used for reserved traffic. As mentioned, these QoS priorities may be configurable by the network operator.

Figure 3:
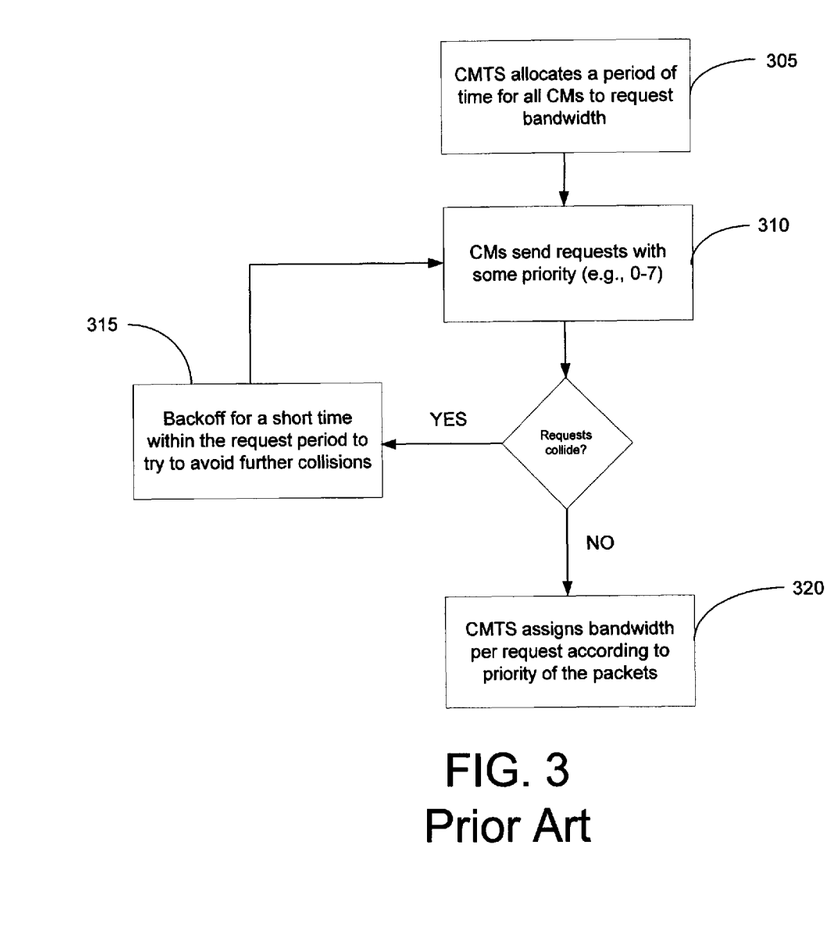
FIG. 3 is a listing of steps taken by devices within the managed access network for requesting bandwidth in order to transmit packets.

FIG. 3 is a listing of steps taken by devices within the managed access network 100 for requesting bandwidth in order to transmit packets. In step 305, the CMTS 115 allocates a predetermined period of time for all CMs within the CM groups 125, 130, 135 to request bandwidth. During that time, in step 310, each CM that is ready to transmit packets associated with video, voice, and/or data sends a request indicating some priority associated with the packets. If a request from one CM collides with a request from another CM, in step 315, the two CMs back off for a short time according to an internal algorithm within the request period to try to avoid further collisions. After the back off time, the two CMs resend the requests. Once the CMTS 115 receives the requests in step 320, the CMTS 115 allocates bandwidth to the requesting CM according to the specified priority of the packet. For example, if a CM requested bandwidth for packets having a priority of 4, the CMTS allocates bandwidth for this CM before allocating bandwidth to a CM that requested bandwidth for packets having a priority of 0.

Figure 4:
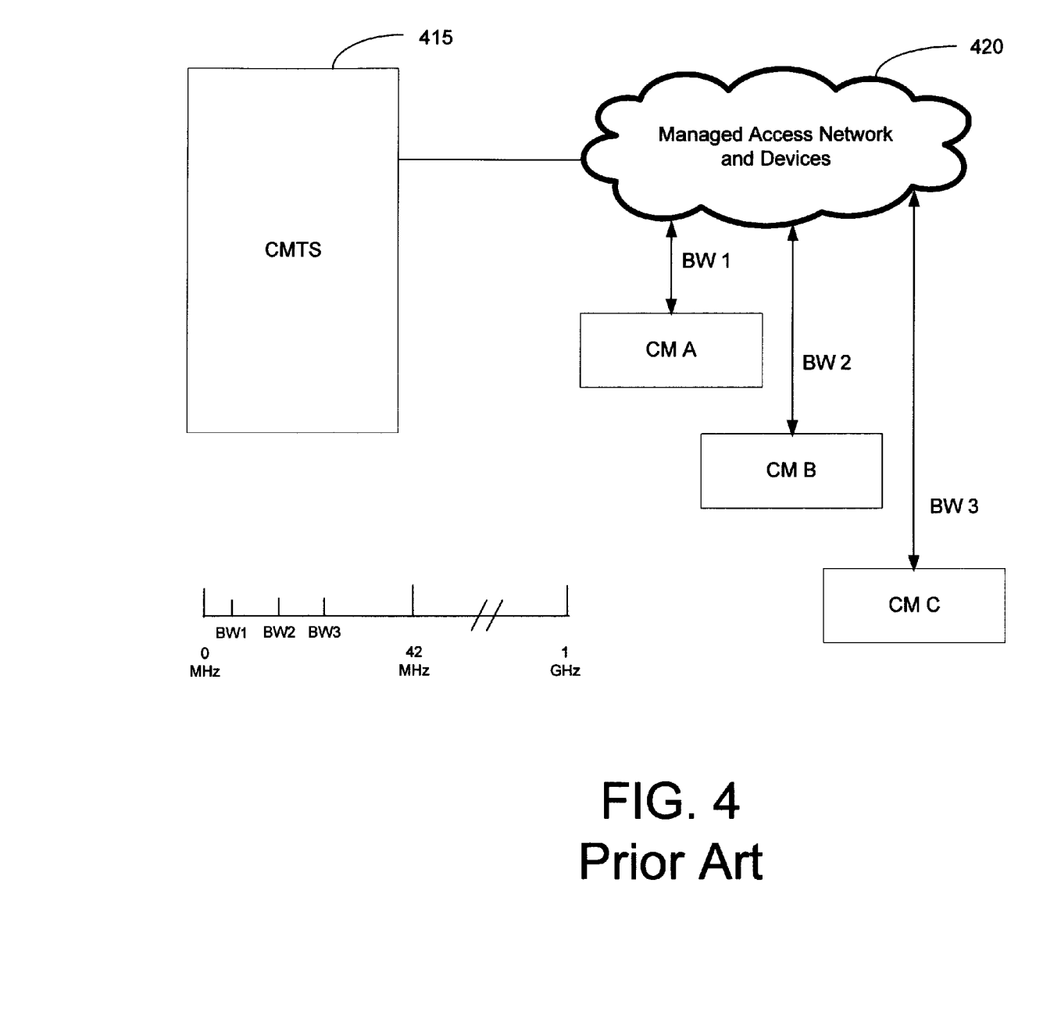
FIG. 4 illustrates an example of dedicating bandwidth to specific network devices in a managed access network.

FIG. 4 illustrates an example of dedicating bandwidth to specific network devices in a managed access network. In order to avoid packet collisions, some operators may choose to give specific network devices, such as CMs, dedicated bandwidths within the frequency spectrum in order to transmit packets at any time. In this case, CM A is assigned exclusivity to transmit within BW1. CM A transmits packets to a CMTS 415 via a managed access network and devices 420. Furthermore, CM B and CM C are assigned exclusivity to transmit packets within BW2 and BW3, respectively. Assigning CMs exclusive bandwidth avoids any collisions with other CMs; however, it requires a great deal of bandwidth that networks seldom have, and the bandwidth is wasted when the CMs do not use it.

Figure 5:
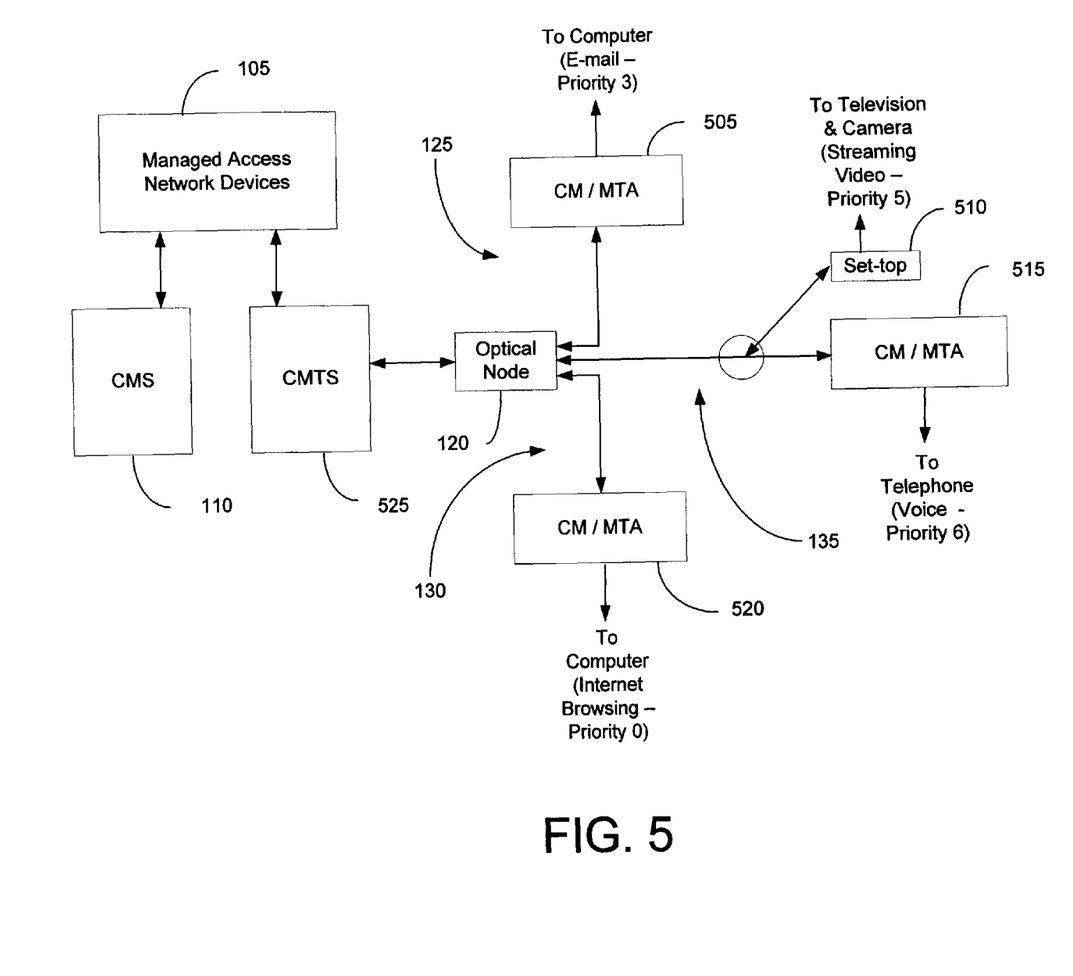
FIG. 5 is an example of a managed access network including systems and methods for transmitting requests in accordance with the present invention.

FIG. 5 is an example of a managed access network including systems and methods for transmitting requests in accordance with the present invention. In order to solve the problems stated above, the present invention continues to have all network devices within all CM groups 125, 130, 135 transmit requests during a same time period and at a same frequency bandwidth. The network devices, however, transmit requests during specific times within the time period depending upon the priority of the packets. For example, the priorities of packets may range from the following: e-mail packets having a priority of 3 generated by a first CM/MTA 505, which is connected to a computer; streaming video packets having a priority of 5 generated by a set-top device 510, which is connected to a television and a camera; voice signals having a priority of 6 generated by a second CM/MTA 515, which is connected to a telephone; and Internet browsing packets having a priority of 0 generated by a third CM/MTA 520, which is connected to a computer. In accordance with the present invention, the network devices 505, 510, 515, 520 will transmit requests to a CMTS 525 during the specific time within the request time period according to the generated packet's QoS.

Figure 6:
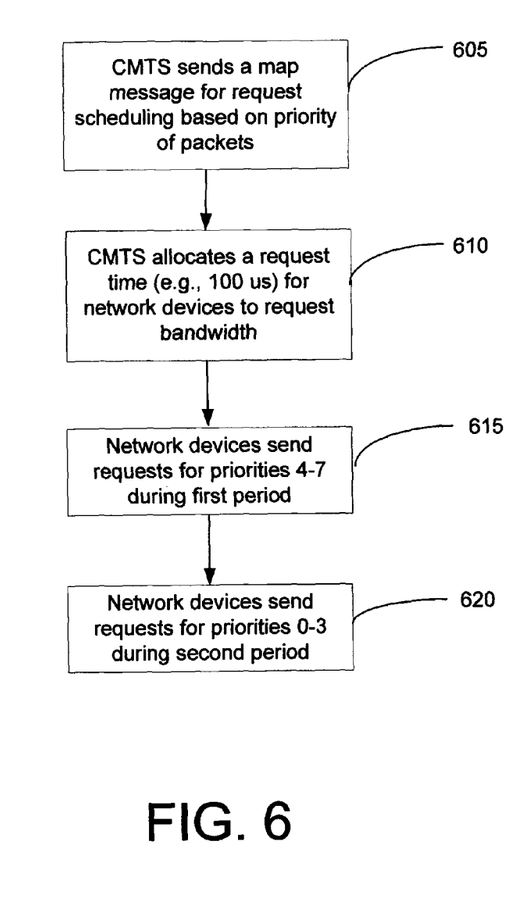
FIG. 6 is a listing of steps taken by devices within the managed access network for requesting bandwidth in order to transmit packets in accordance with the present invention.

FIG. 6 is a listing of steps taken by devices within the managed access network for requesting bandwidth in order to transmit packets in accordance with the present invention. Initially, in step 605, the CMTS 525 sends a map message to all network devices in the access network for request scheduling based on the provisioned QoS priority of packets. The network devices store the request schedule in memory for future reference. In step 610, the CMTS 525 then allocates a period of time, for example, 100 microseconds (μs) every 5 seconds, for the network devices to request bandwidth. During the allocated request time and in accordance with the stored request schedule, in step 615, the network devices wanting to transmit packets having priorities 4-7 may send request packets during a first period within the allocated request time (i.e., 100 μs), and, in step 620, network devices wanting to transmit packets having priorities 0-3 may send request packets during a second period within the request time. Generally, since the majority of request packets transmitted are lower in priority, the second period may further be broken down into a third and fourth period. The first period may also be reduced allowing more time to be allocated to any other period to ensure less packet collisions.

Figure 7:
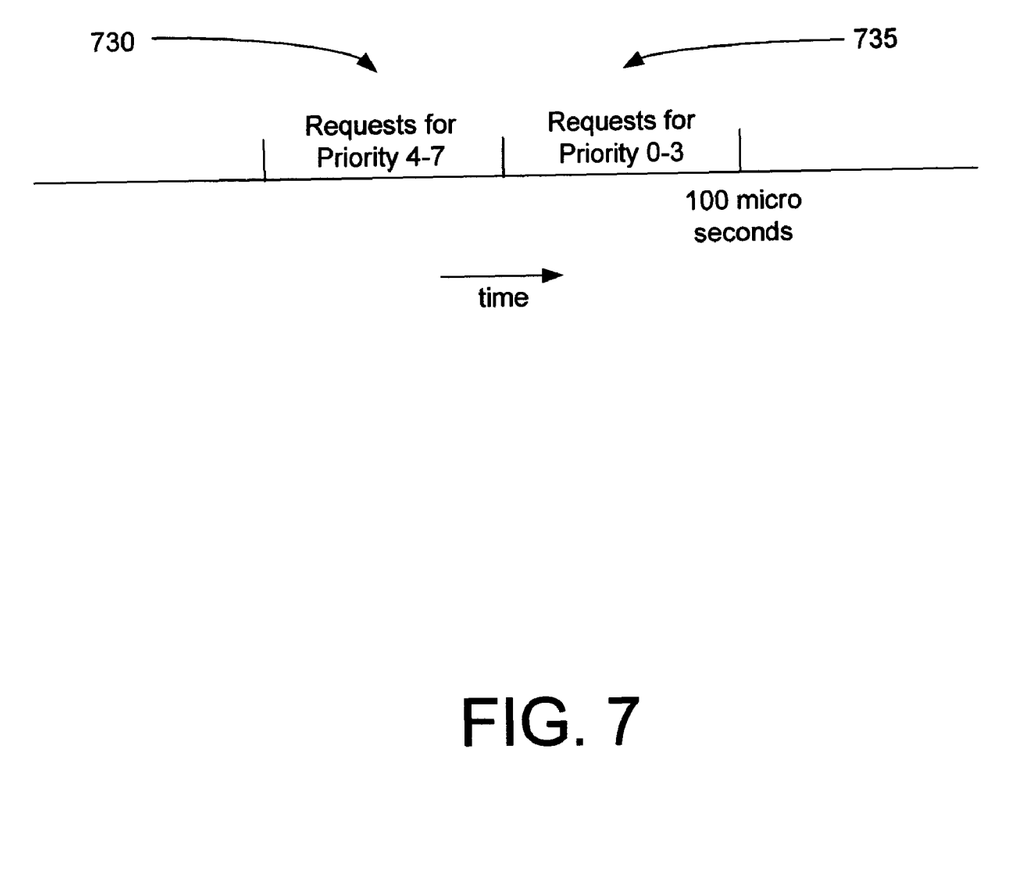
FIG. 7 illustrates example periods within a request time when network devices can request bandwidth depending upon packet priorities.

FIG. 7 illustrates example periods within a request time when network devices can request bandwidth depending upon packet priorities. In accordance with the present invention, CMs transmit requests within a specified bandwidth, such as, for example, at 10 MHz. CMs then transmit the requests to the CMTS 525 via the managed access network 100. During the specified request time, such as 100 μs every 5 seconds, CMs transmit requests according to the priorities and the schedule map. For example, requests for packet bandwidth having QoS priorities 4-7 may transmit during the first 50 μs 730. Thereafter, requests for packet bandwidth having QoS priorities 0-3 may transmit during the second 50 μs 735. As previously mentioned, the time periods can be changed at any time to accommodate changes in the amount of request packets by downloading another map message detailing a new schedule.

Accordingly, systems and methods have been provided that allows for the transmission of requests based on the QoS priority of the generated packets. It will be appreciated that further embodiments are envisioned that implement the invention, for example, using all software or adding modes for additional features and services.

What is claimed is:

1. A method for transmitting requests for bandwidth in an access network, the method comprising:
   generating, at a network device, a first packet having a first priority and a second packet having a second priority, the second priority being lesser than the first priority, wherein the first packet is a streaming video packet;
   receiving, at the network device, a schedule map;
   consulting, at the network device, the schedule map to determine one of a plurality of periods in which to transmit a request during a request time, wherein a period is determined based on the generated packet priorities, and wherein a first period of time within the request time corresponds to the first priority and a second period of time within the request time corresponds to the second priority, wherein the first period of time is reduced when a first number of packets having the first priority is expected to be less than a second number of packets having the second priority; and
   according to the determined period, transmitting the request for bandwidth from the network device, wherein transmitting the request occurs at a specific time that differs from another specific time that a second network device transmits a second request for bandwidth.

2. The method of claim 1, further comprising:
   receiving bandwidth in response to the request; and
   transmitting the first packet.

3. The method of claim 1, further comprising:
receiving and storing in a memory an updated schedule map; and
transmitting the first packet according to the updated schedule map.

4. The method of claim 1, wherein receiving, at the network device, the schedule map comprises receiving at the network device comprising a media terminal adapter.

5. The method of claim 1, wherein receiving, at the network device, the schedule map comprises receiving at the network device comprising a cable modem.

6. The method of claim 1, wherein receiving, at the network device, the schedule map comprises receiving at the network device comprising a device comprising a combination cable modem and media terminal adapter.

7. A system for transmitting requests for bandwidth in an access network, the system comprising:
a managed access network device for transmitting a schedule map, wherein the schedule map includes a plurality of periods, each period corresponding with at least one priority; and
a plurality of network devices for receiving and storing the schedule map, each network device for generating a packet having a priority and for transmitting a request for bandwidth during the period and at a specific time corresponding to the priority of the packet,
wherein the managed access network device is further configured for updating the schedule map in accordance with the amount of requests from the plurality of network devices and for transmitting the updated schedule map to the plurality of network devices for storage, wherein updating the schedule map includes decreasing at least one of the plurality of periods based on an expected number of packets to be received at the managed access network device within the at least one of the plurality of periods; and
wherein a first priority corresponds with a streaming video packet and a second priority corresponds with a packet of lesser importance, and wherein a first period of time within the request time corresponds to the first priority and a second period of time within the request time corresponds to the second priority.

8. The system of claim 7, wherein the managed access network device provides a request time for the plurality of network devices to transmit requests for bandwidth, wherein the request time includes the plurality of periods and the specific time corresponding with the at least one priority of the packet by each of the plurality of network devices.

9. The system of claim 7, wherein the managed access network device receives each request for bandwidth and subsequently allocates bandwidth for each request.

10. The system of claim 7, wherein the plurality of network devices comprise media terminal adapters.

11. The system of claim 7, wherein the plurality of network devices comprise cable modems.

12. The system of claim 4, wherein the plurality of network devices comprise combination cable modems and media terminal adapters.

13. An access network for requesting bandwidth for packet transmission, the access network comprising:
a plurality of network devices each for generating a packet having a priority and for requesting bandwidth indicating the priority for transmitting the generated packet; and
a managed access network device for receiving the request for bandwidth from the plurality of network devices and for allocating bandwidth to each of the plurality of network devices depending upon the priority of each packet received,
wherein the plurality of network devices transmit the request for bandwidth according to a schedule map and the schedule map comprises a plurality of periods and specific times with each period and specific time corresponding to at least one priority,
wherein the managed access network device, updates the schedule map when the amount of requests for bandwidth for each priority changes, wherein updating the schedule map includes decreasing at least one of the plurality of periods based on an expected number of packets to be received at the managed access network device within the at least one of the plurality of periods, and transmits the updated schedule map to the plurality of network devices for storage,
wherein the plurality of network devices further transmit the request for bandwidth during at specific time corresponding to the at least one priority,
wherein a first priority corresponds to a streaming video packet and a second priority corresponds to a packet of lesser importance and a first period of time within the periodic request time corresponds to the first priority and a second period of time within the periodic request time corresponds to the second priority.

14. The access network for requesting bandwidth for packet transmission of claim 13, wherein the plurality of network devices comprise media terminal adapters.

15. The access network for requesting bandwidth for packet transmission of claim 13, wherein the plurality of network devices comprise cable modems.

16. The access network of claim 13, wherein the plurality of network devices comprise combination cable modems and media terminal adapters.

* * * * *